Oct. 22, 1935.
E. L. GARFIELD
Re. 19,729
AIR CONDITIONING SYSTEM AND METHOD
Original Filed Nov. 18, 1930
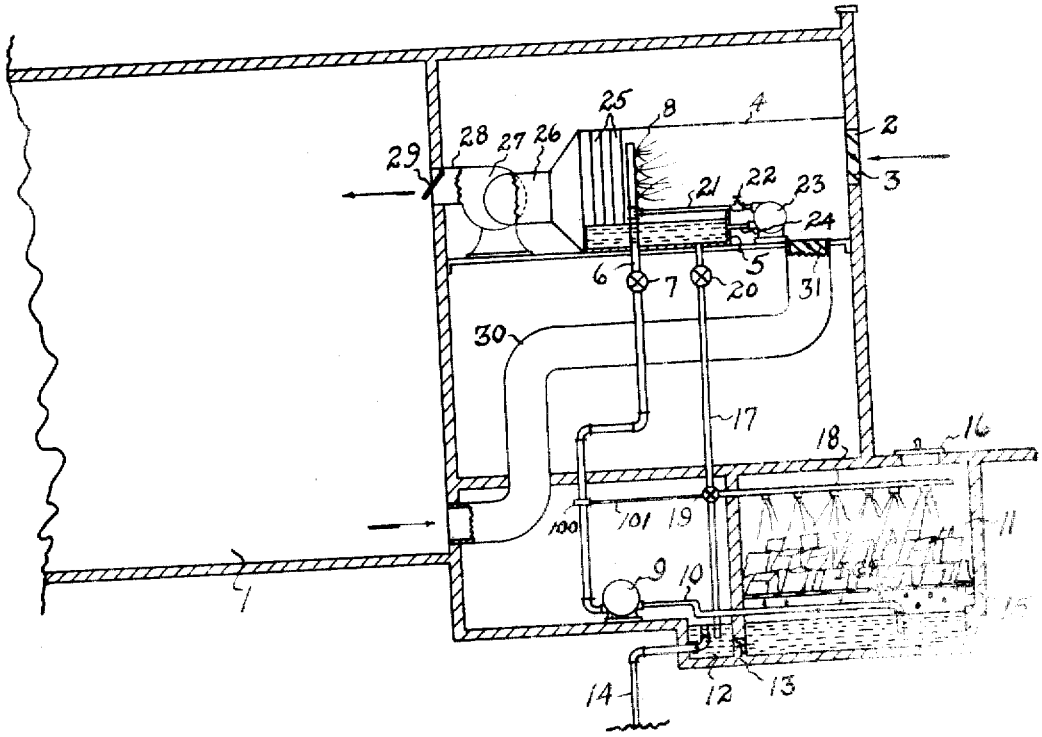
INVENTOR
Edward L. Garfield
BY his ATTORNEYS. Darby & Darby Reissued Oct. 22, 1935

Re. 19,729

UNITED STATES PATENT OFFICE 19,729

AIR CONDITIONING SYSTEM AND METHOD

Edward L. Garfield, Scarsdale, N. Y., assignor to Ice Air Conditioning Company, Inc., New York, N. Y., a corporation of New York Original No. 1,987,188, dated January 8, 1935, Serial No. 496,424, November 18, 1930. Application for reissue April 12, 1935, Serial No. 16,057

9 Claims. (Cl. 62—176)

This invention relates in general to a system and method for conditioning air, that is, controlling its temperature and humidity.

One of the objects of this invention is the provision of an apparatus and method for conditioning air, employing natural ice or manufactured ice.

A further object of the invention is the provision of apparatus and method employing natural ice or manufactured ice in which water is allowed to flow over or circulate around the ice before it is sprayed into the incoming air, and the provision of apparatus to discharge to waste the warmest water, after spraying into air, in an amount approximately equal to the water from the melting ice.

A still further object of the invention is the provision of such a system and method for controlling the amount of water flowing over or around the ice as the ice melts and its surface is reduced in order to maintain the proper temperature of the spraying water.

A still further object of this invention is the provision with the same apparatus of a method of conditioning air at such times as its relative humidity, vapor pressure and the like are such as to produce the desired cooling effect by circulating and spraying water into it without cooling the water.

An important object of this invention involves the control of the amount of water flowed over the surface of the ice before it is sprayed into the air to be conditioned, so that the cooling water will be at substantially the same temperature as the quantity of ice diminishes.

Another important object of this invention is the provision of thermostatic means for controlling the mechanical valve which proportions the amount of return water going to the ice and to the receptacle of the ice chamber.

These and other objects as will appear from the following disclosure are secured by means of this invention.

This invention resides substantially in the combination, construction, arrangement, relative location of parts, steps and series of steps, as will be set forth in detail below.

Referring to the drawing, the single figure is a sectional diagrammatic view of the apparatus of this invention.

Previous attempts to employ natural ice or manufactured ice in cooling and conditioning air for use in rooms, and indeed for any use, has largely failed because prior users did not realize the necessity for compensating for the reduction in area of the ice as it melted, and hence were not able to get uniformly conditioned air. If they did realize this reason for not being able to get uniformly conditioned air, they conceived no means or method by which such compensation could be effected.

The general object of this invention is to provide an air conditioning that is humidifying and cooling, apparatus and method employing ice by which as the ice melts a uniformly conditioned air is produced.

The apparatus and method will best be understood by direct and detail reference to the drawing.

At 1 is shown the room or place the air of which is to be conditioned. It is of course apparent that the conditioned air may be used for any desired purpose. At 2 is an opening exteriorly of the space into the open atmosphere, which is controlled by means of a suitable shutter arrangement 3 to vary the amount of fresh entering air. Air passes through this opening into a chamber 4 within which is mounted a suitable water receptacle 5. Projected into this chamber and through the water receptacle is a pipe 6 controlled by a valve 7 and having a plurality of nozzles 8 directed into the path of the incoming air. The lower end of pipe 6 is connected to the discharge port of a suitable pump 9. The intake port of this pump is connected to pipe 10. The ice cabinet or chamber is shown at 11, and is provided at the bottom with a water receptacle. The water receptacle is substantially divided into a large body and a smaller body 12 by means of one of the walls of the ice chamber. This wall is provided with a passage 13. The level of the smaller water body 12 is maintained at a predetermined point by means of pipe 14 which delivers into a drain. Within the ice chamber 11 is a perforated platform 15 upon which the ice rests. It is noted that pipe 10 projects into the large water body in the ice cabinet. The cover 16 is removed when it is desired to place ice within the ice chamber.

The water receptacle 5 is connected by a pipe 17 which is submerged in the smaller water body 12. This pipe is provided with a control valve 20 and a mixing valve 19. The mixing valve can of course be of any of the many well known forms. Pipe 17 and mixing valve 19 are connected by a branch pipe 18 which extends into the ice chamber and is provided with a series of nozzles which spray water over the ice. Pipe 7 within chamber 4 is provided with a branch pipe 21 which connects to the discharge port of a pump 23. This pipe is provided with a control valve 22. The second port of the pump 23 is connected by pipe 24 to a point below the water level in receptacle 5. The discharge end of chamber 4 is provided with a series of vertical eliminator plates 25 of any known construction by means of which the drops of water sprayed into the air are removed therefrom. The discharge end of chamber 4 is connected by pipe 26 to the intake port of a blower 27. The delivery port of this blower is connected by pipe 28 to the space 1. A suitable damper or flap valve 29 is provided to control the amount and velocity of air being discharged into the space. Pipe 28 should discharge into the space 1 near the top thereof. An air pipe 30 connects space 1 near the bottom thereof with chamber 4. At the point where pipe 30 enters chamber 4 there is provided a suitable shutter valve 31 for controlling the amount of air delivered thereinto. In the operation of this system air valves 3, 29, and 31 are adjusted so that the proper quantity of fresh air is being delivered into the space 1 and the air in the space is being recirculated at the desired rate. When ice is to be used for reduction of temperature and humidity in the air, valve 22 is closed and pump 23 does not operate; valves 7 and 20 are open and pump 9 is operating as well as blower 27.

Water from the bottom of the ice chamber is drawn through pipe 10 by the pump 9 and delivered through pipe 6 to the sprays 8. Here the cooled water is sprayed into the fresh air entering the system through the opening 2, and the previously used air entering chamber 4 through pipe 30. The air passes through the spray and into discharge pipe 26 after passing through the eliminator or baffle plates 25. With the system properly adjusted the air delivered by blower 27 into the space has the correct temperature and humidity desired. The sprayed water from nozzles 8 falls into tank 5 and drains therefrom through pipe 17 into receptacle 12 or part or all of this returned water is shunted through the mixing valve in a quantity depending upon the adjustment of the mixing valve, into pipe 18 and is sprayed therefrom over the ice. This sprayed water flows over the surface of the ice, melting it, thus becoming cooled, and then drains into the receptacle at the bottom of the ice chamber. Drain 14 maintains the proper water level and it is the warmer water which is drawn away. The cooling water falling from the ice is again circulated through pipe 10, pump 9 and pipe 6 to the sprays 8. The important feature of this invention resides in the thermostatically or manually controlled valve 19 by means of which the water returning through pipe 17 is divided so as to be delivered to tank 12 and the sprays in pipe 18 in the proper proportion. At 100 is the thermostatic device connected by the means 101 to the mechanical valve 19. As shown in the drawing this thermostatic device is subjected to the temperature of the water being delivered from the receptacle of the ice chamber to the sprays 8. Hence valve 19 is automatically adjusted to maintain a substantially constant temperature of spray water as the ice melts.

The invention does not involve per se the form of thermostatic device employed since any of the well known forms may be used, such as the electrical type, the fluid pressure type, and the like. It is also pointed out that the thermostatic device can be placed adjacent the inlet of pipe 30 or at any other point in the system suitable for effecting the proper control.

As the ice melts valve 19 is adjusted so that more and more water flows over the ice and less returns directly to receptacle 12. Thus as the quantity of ice diminishes by melting, the reduction in cooling surface is compensated for by controlling the amount of water sprayed thereover. Valve 19 may be adjusted so that none of the water returns to receptacle 12, but all of it is sprayed over the ice.

Another feature of this system is that when the relative humidity, vapor pressure, etc., of the air is at values which will permit it, sufficient cooling and humidifying of the air may be obtained, without the use of ice. In this operation of the system valves 7 and 20 are closed, valve 22 is open and pump 23 is operated. Of course, blower 27 is also operating, although pump 9 is not in operation. The water in receptacle 5 is then continuously circulated through pump 23 and sprayed into the air. The evaporation of the sprayed water is then sufficient to maintain a substantially uniform temperature condition, if the air being treated is at the proper temperature, relative humidity and vapor pressure.

From the above description it will be apparent that this invention recites certain principles which may be employed in other physical forms and carried out in other ways without departure from the invention. I do not, therefore, desire to be strictly limited to the disclosure as given for purposes of illustration, but rather to the scope of the appended claims.

What I seek to secure by United States Letters Patent is:

1. In an air cooling and conditioning system the combination comprising an ice chamber having a water receptacle therein, means for circulating water over the ice in the ice chamber, means for delivering the water from the water receptacle and spraying it into air confined to a flow path, means for returning the sprayed water to the receptacle and to the means for circulating water over the ice, and automatic means for controlling the amount of water returned directly to the receptacle and the amount of water returned to the means for circulating water over the ice to maintain a constant spray water temperature.

2. A combination as described comprising a space, the air of which is to be conditioned, said space having air inlet and outlet ports, a pipe system including a blower connected to said ports and to a source of fresh outside air, means for spraying water into the air as it circulates through said pipe system, means for collecting the sprayed water including a tank, an ice chamber having a water receptacle, means for delivering water from said receptacle to said sprays at a substantially constant temperature, a water spray in said ice chamber, and connections between said tank, said receptacle and said water spray in the ice chamber including control means for proportioning the amount of water delivered to the water spray in the ice chamber and the water receptacle as the area of the ice is reduced by melting to maintain the temperature of the water going to the means for spraying water into the air substantially constant.

3. In an apparatus of the type described the combination comprising means for defining a path of air flow having an inlet and an outlet, a space into which the outlet discharges, means for spraying water into the air as it flows through said means for defining a path of air flow, an ice chamber having a receptacle below the ice, means for returning the sprayed water, part for circulation over the ice and part to the receptacle, and means controlled by the temperature of the water sprayed into the air for automatically proportioning the parts circulated over the ice and returned to the receptacle.

4. In an apparatus of the type described the combination comprising means for defining a path of air flow having an inlet and an outlet, a space into which the outlet discharges, means for spraying water into the air as it flows through said means for defining a path of air flow, an ice chamber having a receptacle below the ice, means for returning the sprayed water, part for circulation over the ice and part to the receptacle, and thermostatic means for automatically proportioning the parts circulated over the ice and returned to the receptacle.

5. In an apparatus of the type described the combination comprising means for defining a path of air flow having an inlet and an outlet, a space into which the outlet discharges, means for spraying water into the air as it flows through said means for defining a path of air flow, an ice chamber having a receptacle below the ice, means for returning the sprayed water, part for circulation over the ice and part to the receptacle, thermostatic means for automatically proportioning the parts circulated over the ice and returned to the receptacle, said thermostatic means being subject to the temperature of the water going to the spraying means.

6. In a method of conditioning air, the steps of spraying cooled water into the air to be conditioned, dividing the water after spraying into two parts, delivering one part directly to a receptacle, spraying the other part over ice, varying the quantity of the part sprayed over the ice as the area of the ice is reduced by melting, collecting the part sprayed over the ice in the receptacle with the first part, the mixture in the receptacle providing the cooled spraying water for spraying into the air and providing it at a substantially constant temperature as the ice melts, and controlling the variation of the amount of the part sprayed over the ice by the temperature of the water being sprayed into the air.

7. In an air cooling and conditioning system the combination comprising an ice chamber having a water receptacle therein, means for circulating water over the ice in the ice chamber, means for circulating the water from the water receptacle in heat exchange relation with air confined to a flow path, means for returning the circulated water to the receptacle and to the means for circulating water over the ice, and automatic means subject to the temperature of the water going to the circulating means for controlling the amount of water returned directly to the receptacle and the amount of water returned to the means for circulating water over the ice to maintain a constant temperature of the water delivered to the circulating means.

8. In an apparatus of the type described the combination comprising means for defining a path of air flow having an inlet and an outlet, a space into which the outlet discharges, means for circulating water in heat exchange relation with the air as it flows through said means for defining a path of air flow, an ice chamber having a receptacle below the ice, means for returning the circulated water, part for circulation over the ice and part to the receptacle, and means controlled by the temperature of the water circulated in heat exchange relation with the air for automatically proportioning the parts circulated over the ice and returned to the receptacle.

9. In an apparatus of the type described the combination comprising means for defining a path of air flow having an inlet and an outlet, a space into which the outlet discharges, means for effecting heat exchange between water and the air as it flows through said means for defining a path of air flow, an ice chamber having a receptacle below the ice, means for returning the water, part for circulation over the ice and part to the receptacle, and thermostatic means subject to the temperature of the water going to the circulating means for automatically proportioning the parts circulated over the ice and returned to the receptacle.

EDWARD L. GARFIELD.